United States Patent [19]

Engel et al.

[11] Patent Number: 5,008,155

[45] Date of Patent: Apr. 16, 1991

[54] AQUEOUS DISPERSIONS FOR THE PREPARATION OF CROSSLINKABLE COATINGS

[75] Inventors: Dieter Engel, Kelsterbach; Josef Mondt, Königstein/Taunus; Klaus Zimmerschied, Wiesbaden, all of Fed. Rep. of Germany

[73] Assignee: Hoechst Aktiengesellschaft, Frankfurt am Main, Fed. Rep. of Germany

[21] Appl. No.: 409,082

[22] Filed: Sep. 19, 1989

Related U.S. Application Data

[60] Division of Ser. No. 143,346, Jan. 5, 1988, abandoned, which is a continuation of Ser. No. 714,046, Mar. 19, 1985, abandoned.

[30] Foreign Application Priority Data

Mar. 21, 1984 [DE] Fed. Rep. of Germany ....... 3410234

[51] Int. Cl.$^5$ .......................... B32B 15/08; B32B 27/00
[52] U.S. Cl. ...................................... 428/463; 427/379;
427/386; 427/388.2; 427/388.3; 427/388.4;
428/500; 524/509; 524/548; 524/811
[58] Field of Search ...................... 427/375, 379, 385.5,
427/386, 388.1, 388.2, 388.3, 388.4, 389.7,
389.8, 389.9, 391, 392, 393, 393.5, 393.6;
524/548, 509, 811; 428/463, 500

[56] References Cited

U.S. PATENT DOCUMENTS

| | | | |
|---|---|---|---|
| 3,904,795 | 9/1975 | Mercurio | 427/375 |
| 4,264,656 | 4/1981 | Reeder | 427/385.5 |
| 4,351,755 | 9/1982 | Brixius et al. | 427/388.2 |
| 4,431,689 | 2/1984 | Gunter | 427/388.2 |
| 4,522,972 | 6/1985 | Mondt et al. | 524/548 |

*Primary Examiner*—Michael Lusignan
*Attorney, Agent, or Firm*—Berman, Aisenberg & Platt

[57] ABSTRACT

Aqueous dispersion for the production of crosslinkable surface coatings, containing, as the binder, a crosslinkable dispersion copolymer formed from olefinically unsaturated monomers and, if appropriate, further customary formulation constituents of lacquers, the dispersed particles of copolymer having average particle diameters from 0.5 to 10 μm and the proportion in the dispersion copolymer of comonomer units carrying crosslinkable groups being greater than 10% by weight, relative to the dispersion copolymer.

The preparation of the dispersion by emulsion or suspension copolymerization, in particular with the addition of free radical chain transfer substances, and also the use of the dispersion as a constituent of baking lacquers, hydrofillers, metallic paints and EPC paints.

Also a process for the bake-coating of surfaces of solid substrates using the abovementioned aqueous dispersion, wherein the required amount of dispersion is applied to the surface to be coated and is dried at a temperature below its minimum film-forming temperature, and the dried coating is crosslinked by baking at a temperature above the glass transition temperature.

10 Claims, No Drawings

AQUEOUS DISPERSIONS FOR THE PREPARATION OF CROSSLINKABLE COATINGS

Related Applications

This application is a division of Application Ser. No. 143,346, filed Jan. 5, 1988, now abandoned, which is a continuation of Application Ser. No. 714,046, filed Mar. 19, 1985; now abandoned.

The invention relates to aqueous dispersions based crosslinkable dispersion copolymers formed from olefinically unsaturated monomers for the preparation of crosslinkable coatings on surfaces, to their preparation and to their use, particularly for baked coatings and lacquers.

In recent years, rising prices of raw materials, restrictive regulations for the protection of the environment and also safety requirements have led to numerous developments in the field of baking lacquers having the common aim of finding systems which are not only economical but also environmentally acceptable.

In this respect, the lacquer material must meet the following requirements:
(1) Little or no content of organic solvents and substances having a harmful action in the state before processing.
(2) Little or no liberation of cleavage products when lacquer systems are baked.
(3) The use of substantially non-toxic raw materials in lacquer formulations.
(4) Problem-free cleansing and waste disposal in lacquering plants.
(5) Problem-free effluent treatment.
(6) Cost-saving production and processing.
(7) Little or no necessity to alter the technical equipment of existing lacquering plants.

Taking these requirements as a basis, the development of new lacquering systems has aligned itself essentially into three directions. The basic idea of the first direction consists in developing conventional lacquers further to give high-solids lacquering systems of high solids content and hence low solvent content. But even in these, during the processes of application, exposure to the atmosphere and baking, solvent is still released and must be removed, for example in subsequent combustion plants. The reduction of solvent content in the high-solids systems is, of course, only possible as the result of using special binders. In more highly concentrated solutions, these must have markedly lower viscosities than the conventional lacquer resins. However, film formation can only take place if the development of a three-dimensional network is possible on baking. The binders must therefore be composed of reactive co-reactants.

As already indicated, a factor common to all of these lacquer formulations is that there can be no question of dispensing completely with solvents, and thus the fulfilment of all the requirements mentioned above is, for reasons of principle, not possible.

The second line of development which has evolved from the requirements mentioned above is represented by the so-called powder lacquers. This term is to be understood as meaning thermoplastics which can be applied in powder form to substrates. Different modes of application technology are distinguished, such as, for example, electrostatic powder spraying, electrostatic fluidization dip coating, pressureless sintering, rotational sintering and others.

The development of powder lacquer technology admittedly signifies a marked improvement in the sense of an ecologically advantageous lacquering system. Disadvantages exist, however, in the form of high capital costs, a complicated change in color shade and high consumption of materials. It should also be borne in mind that the powder form of the lacquer material involves the risk of dust explosions and that the storage and transport of the lacquer products pose problems.

The third line of development is based on the concept of formulating lacquer systems on the basis of aqueous binder systems. In this respect, a distinction must be drawn between systems in which the solid phase dispersed in water is already composed of lacquer particles which are in themselves pigmented and systems in which separate particles of binder and pigment are present alongside one another. The first case is present in the so-called powder-slurries, while the second case describes the situation in baking versions. The development of aqueous powder suspensions or slurry-paints is based on the concept of mixing the environmentally acceptable powder lacquer with water as diluent to give an aqueous lacquer ready for spraying which can be processed on conventional lacquering equipment without the involved processes required for powder lacquering. The preparation of powder-slurries can be effected by various processes, all of which are very expensive and in which it is first necessary to prepare a conventional, solvent-containing lacquer or a powder lacquer which is then converted into an aqueous secondary dispersion.

A substantial simplification in the preparation of aqueous baking lacquer systems consists in employing high-polymer binder dispersions prepared, for example, via emulsion polymerization and pigmenting these like a normal emulsion paint. The difference in principle from the abovementioned secondary dispersions is that in pigmented dispersions of this type the binder and the pigment are separately present alongside one another in the aqueous suspension, whereas the secondary dispersions are aqueous suspensions of lacquer particles which have already been pigmented. A decisive advantage of lacquer systems based on pigmented dispersions, in addition to advantages of processing and ecological advantages, is the cost-advantageous manner in which they are prepared. The binder can be prepared in the form of an aqueous dispersion, for example via emulsion and/or suspension polymerization, and can be employed immediately.

The binder dispersions used for this purpose can form a film at temperatures as low as room temperature or can be induced to form a film only by baking processes. However, baking dispersions based on water which form a film even at the drying or exposure temperature used or at lower temperatures can give rise to characteristic lacquer defects, pits as they are called, in the finished coatings.

These pits are formed because, after the aqueous lacquer material has been applied to the surface of the substrate to be coated, film formation at the lacquer surface sets in as soon as the water evaporates. The water still present in the interior of the film cannot escape, because the surface of the film acts as a vapor barrier. The water only evaporates off in the baking process, in the course of which the surface which has already formed a film is torn open again. As a result of the crosslinking which sets in at elevated temperatures, the film area spoilt by the escape of vapor does not seal again. The result is generally a crater-shaped blemish in the lacquer which constitutes a weak point in respect of corrosion resistance and resistance to mechanical stress, to say nothing of the impairment in the decorative effect of the coat of lacquer.

It is possible to avoid a lacquer defect of this type by raising the minimum film-forming temperature of the binder dispersion to values above the temperature of exposure or drying.

A process for coating surfaces in which a pigmented or unpigmented aqueous dispersion of a meltable copolymer having an average particle diameter within the range from 0.5 to 10 μm is applied to the substrate to be coated, is, for example, known from German Offenlegungsschrift 2,416,446. The minimum film-forming temperature should be between 10° and 200° C. The coating applied to the substrate should be in the form of a coherent powder after the water has evaporated completely into the atmosphere. Baking is carried out at temperatures at which the particles melt to form a continuous, crack-free film, for example at 177° C. (15 minutes) in the case of acrylic polymers. The thickness of the coating is within the range from 2.5 to 250 μm. However, this coating process has the disadvantage that five process stages are required to prepare the copolymers having the required particle sizes, which, inter alia, is very uneconomical.

In order to obtain surface coatings which are resistant to a very wide variety of effects, it is usual to crosslink the coatings after application. This is effected either via so-called extraneous crosslinking, in which one or more further components carrying reactive groupings are mixed into the formulation, or via selfcrosslinking, for which reactive monomers are copolymerized into the binder. In both of the cases distinguished here, the crosslinking can be induced, for example, by heat, light or radiation. Resistance to solvents, as well as resistance to water, is a measure of the strength of surface coatings.

According to German Offenlegungsschrift 2,416,446 the maximum content of crosslinkable monomer units in crosslinkable copolymers is 10% by weight, relative to the total amount of monomer units in the copolymer. Preferably, the maximum should be about 5% by weight. Larger amounts of certain crosslinkable monomer units can increase the hydrophilic character of the copolymers. If the copolymer is too strongly hydrophilic, coatings produced therefrom can have undesirable and harmful properties.

As far as the resistance to solvents and water of baked coatings and the resistance of the latter to mechanical stress is concerned, it has been found that coatings prepared in accordance with German Offenlegungsschrift 2,416,446 after baking frequently do not have the advantageous properties required in this respect.

It was therefore required to provide a water-dispersible binder which firstly can be prepared in a simple manner, compared with the state of the art, and, secondly, meets the requirements which have to be set for crosslinkable binders in respect of parameters relating to use, such as melt viscosity, film-formation temperature, pigment compatibility, resistance to solvents and water, elasticity, adhesion, gloss and sharpness of representation.

It has now been found, surprisingly, that the above-mentioned disadvantages can be overcome advantageously if a binder based on a dispersion copolymer formed from olefinically unsaturated monomers, which is composed, to the extent of over 10% by weight, relative to the dispersion copolymer, of monomer units carrying crosslinkable groups and which has been prepared by free radical-initiated emulsion or suspension copolymerization, preferably with the addition of substances which transfer free radical chains, is employed for the preparation of crosslinkable surface coatings.

In accordance with the invention, the dispersion copolymer is preferably composed of 11 to 25% by weight, in particular 12 to 20% by weight, of comonomer units carrying crosslinkable groups.

In the light of the above subject of the invention, the prejudice evident from the state of the art, according to which the content of monomer units carrying crosslinkable groups in crosslinkable binder copolymers should not exceed a maximum figure of 10% by weight, relative to the copolymer, proves unfounded. For it is possible, when using crosslinkable dispersion copolymers according to the invention, to obtain crosslinked baked coatings which, in addition to very good resistance to water, also have excellent resistance to solvents.

The average particle diameters of crosslinkable dispersion copolymers according to the invention are preferably within the range from 0.5 to 10 μm, particularly preferably within the range from 0.5 to 5 μm.

The invention relates, therefore, to aqueous dispersions for the preparation of crosslinkable surface coatings, containing, as the binder, a crosslinkable dispersion copolymer formed from olefinically unsaturated monomers and, if appropriate, further ingredients from the group comprising pigments, dyestuffs, extenders, water-soluble and/or water-dispersible resins, extraneous crosslinking agents, crosslinking catalysts, thickeners, thixotropic agents, wetting agents, anti-corrosion agents, antifreeze agents, light stabilizers, anti-oxidants and anti-foaming agents, the dispersed copolymer particles having average particle diameters from 0.5 to 10 μm, wherein the proportion of comonomer units carrying crosslinkable groups in the dispersion copolymer is greater than 10% by weight, relative to the dispersion copolymer. The aqueous dispersions, having no quaternary-ammonium groupcontaining polymer, are anionic or nonionic.

The preparation of the dispersion copolymer is preferably carried out by emulsion or suspension copolymerization, in particular with the addition of free radical chain transfer substances, particularly preferably compounds containing mercapto groups.

In accordance with the invention, the dispersion copolymer is preferably composed of 11 to 25% by weight, in particular 12 to 20% by weight, relative to the dispersion copolymer, of comonomer units carrying crosslinkable groups, these comonomer units preferably containing functional, crosslinkable radicals from the series comprising hydroxyl, amido, aldehyde, carboxyl, amino, epoxy, thiol, cyano, N-methylol, isocyanato and/or masked isocyanato groups. Hydroxyl, carboxyl and epoxy groups are particularly preferred.

In a preferred embodiment, the aqueous dispersion according to the invention additionally contains a watersoluble and/or water-dispersible resin, in particular a resin from the series comprising acrylic resins, melamineformaldehyde resins and isocyanate resins.

The aqueous dispersions according to the invention are preferably used as an ingredient of baking lacquers, hydro-fillers, metallic paints and electropowder coatings (EPC lacquers).

The invention also relates to a process for bakecoating surfaces of solid substrates using the aqueous dispersions, according to the invention, described above, applying the required amount of dispersion to the surface to be coated, drying and subsequently baking the dried layer of dispersion accompanied by crosslinking of the binder copolymer, which comprises carrying out the drying of the applied amount of dispersion at a temperature below the minimum film-forming temperature of the dispersion and subsequently baking the dried coating at a temperature above the glass transition temperature (Tg). A minimum film-formation temperature of the dispersion within the temperature range from 35° to 120° C., in particular 40° to 80° C. is preferred.

The preparation of binder dispersions according to the invention is preferably effected by emulsion copolymerization, it being possible to use either the process of seed polymerization, which involves at least two stages, or single-stage processes which can produce the desired particle sizes if carried out in an appropriate manner. In addition, it is also possible to use suspension copolymerization processes.

If the seed polymerization process is used, the number of growth stages or swelling stages should be kept as low as possible for practical reasons. Seed polymerizations which can produce a coarse-grained latex in not more than two stages are preferred. The first stage then consists in preparing a seed latex, while, in the second stage, the seed latex is swollen to the desired particle diameter, the formation of new particles being avoided as completely as possible. For this purpose it is preferable to start from a substantially monodisperse latex according to the state of the art as seed base, to which, in a further stage, sufficient monomer is applied to achieve, while maintaining the monodisperse state, an average particle diameter in the final latex greater than 0.5 μm. As is already known (cf. Houben-Weyl, Methoden der Organischen Chemie ("Methods of organic chemistry") volume 14 I, 339 f, (1961)), the metered addition of the emulsifier and/or the concentration of emulsifier in the particular case is of essential importance. Thus, care should, inter alia, be taken that, for example, the surface covering of the particles with ionic emulsifier is preferably less than 100%.

Emulsifiers which can be employed are ionic and nonionic emulsifiers or mixtures thereof. Examples of anionic emulsifiers which are preferably employed are the sodium salts of higher fatty alcohol sulfates, higher alkylsulfonates, or alkylarylsulfonates and the alkali metal and/or ammonium salts of alkyl polyglycol ether-sulfonates or ether-sulfates or alkylaryl polyglycol ether-sulfonates or ether-sulfates.

In the case of nonionic emulsifiers, it is preferable to employ oxethylated fatty alcohols or oxethylated alkylphenols.

In view of the desired particle size, the total amount of emulsifier metered in during the copolymerization should be kept as low as possible. For example, if a certain amount of emulsifier is necessary to increase the stability of the dispersion on storage, this amount can be partly or wholly metered in subsequently.

The olefinically unsaturated, copolymerizable monomers employed for copolymerization must be selected or combined in such a way that the resulting copolymeric binder and the finished coating system have a "minimum film-forming temperature" (MFT) of such a kind that this temperature is still above the temperature of evaporation into the atmosphere or drying. The glass transition temperature of the homopolymers concerned can be used as a reference point for practical selection of monomers in respect of MFT, in order to adjust the film-formation temperature in this way to suitable values.

In order to achieve the desired technical properties in use in the finished Lacquer, the copolymeric binder must, in accordance with the invention, contain not only non-functional monomer units but also more than 10% by weight of functional monomer units which enable crosslinking reactions to be carried out. In this respect it is possible to carry out either self-crosslinking of the copolymer molecules or extraneous crosslinking with other components which have been additionally introduced.

The non-functional, olefinically unsaturated monomers employed are preferably esters of acrylic and methacrylic acid in which the alcohol component can contain 1 to 18 carbon atoms. Examples of these are esters containing the radicals methyl, ethyl, methylpropyl, n-butyl, 2-ethylhexyl, heptyl, octyl, propyl, 2-methylbutyl, pentyl, methoxymethyl, ethoxymethyl, ethoxyethyl, isobutyl, cyclohexyl or n-hexyl as the alcohol component.

Furthermore, it is also possible to employ other non-functional monomers, such as, for example, vinyl aromatic compounds, preferably styrene, vinyltoluene and α-methylstyrene. Acrylonitrile and methacrylonitrile can also be employed with advantage.

In order to be able to carry out crosslinking reactions in the lacquer applied when film-formation takes place, monomer units having functional groups must be present in the binder copolymer both in the event of self-crosslinking and in the event of extraneous crosslinking. Monomers having functional groups are to be understood as meaning monomers which, in addition to their olefinic double bond, by means of which they are copolymerized into the resulting copolymer during the preparation of the binder, also contain, in addition, chemical groupings which can be reacted at a later time, preferably after the application of the finished lacquer, with chemical groupings of the same type or of a different type under the influence of energy (heat energy, optical energy or radiation) and/or catalysts, in such a way that a network is formed.

Preferred examples of chemical groupings which can be employed here and can lead to crosslinking in the applied lacquer material, are carboxylic acid, sulfonic acid, hydroxyl, amino, amido, keto, aldehyde, lactam, lactone, isocyanate and epoxy groups. Copolymerizable monomers carrying functional groupings of this type are known.

Amongst monomers carrying carboxylic acid groupings, it is preferable to employ acrylic acid, methacrylic acid, crotonic acid, itaconic acid, fumaric acid, maleic acid, maleic acid half-ester or the half-esters of itaconic acid and of fumaric acid. Acrylic acid and methacrylic acid are particularly preferred.

Amongst monomers carrying epoxide groupings suitable for crosslinking, it is preferable to employ glycidyl methacrylate, glycidyl acrylate and allyl glycidyl ether.

Further copolymerizable monomers which carry functional groups and can be utilized for crosslinking reactions of binders according to the invention, are monomers containing isocyanate groups, for example preferably isocyanatoethyl methacrylate, and derivatives thereof containing a masked isocyanate group, and also aminoalkyl compounds, preferably, for example, methylaminoethyl methacrylate and tert.-butylaminoethyl methacrylate, amides, preferably, for example, methacrylamide, N-alkoxyalkylamides, preferably, for example, methoxymethylmethacrylamide or ethoxymethylmethacrylamide, or hydroxyalkylamides, preferably, for example, N-methylolmethacrylamide and hydroxyalkyl esters, preferably, for example, hydroxyethyl methacrylate and hydroxypropyl methacrylate; and also the analogs of the abovementioned methacrylic acid derivatives derived from other unsaturated acids, preferably derived from acrylic acid, itaconic acid or crotonic acid.

As monomer units, relative to the dispersion copolymer, preferred binder dispersion copolymers can contain, for example, 0 to 85% by weight of methyl methacrylate, 60 to 0% by weight of butyl acrylate, 0 to 20% by weight of hydroxyethyl methacrylate, 20 to 0% by weight of glycidyl methacrylate and 0 to 20% by weight of acrylic acid or methacrylic acid. Binder dispersions which are particularly preferred can contain, relative to the dispersion copolymer, for example, 50 to 85% by weight of methyl methacrylate, 15 to 50by weight of butyl acrylate, 0 to 15% by weight of hydroxyethyl methacrylate, 15 to 0% by weight of glycidyl methacrylate and 2 to 10% by weight of acrylic acid or methacrylic acid as monomer units.

In addition to self-crosslinking, so-called extraneous crosslinking is also possible. This is effected by mixing a finished binder copolymer dispersion containing one or more of the types of functional monomer units described above with another low-molecular, oligomeric or polymeric compound which also carries functional groups of the type mentioned above.

The crosslinking of the binder is also effected in the course of the extraneous crosslinking, preferably in the course of baking, preferentially by means of a reaction between the functionalized binder copolymer and the extraneous added component. In this respect it is not always possible to exclude the possibility that two components will also be capable of undergoing reaction/-crosslinking with themselves.

Preferred examples of crosslinking extraneous components are melamine-formaldehyde resins, acrylic resins and masked isocyanate resins, i.e. isocyanate resins having a blocked isocyanate group, which, in the course of baking, can produce highly crosslinked coatings with or without the action of catalysts, such as, preferably, maleic, citrous or phosphoric acid, an alkylphosphoric acid, p-toluenesulfonic acid and/or naphthalenedisulfonic acid, and in the presence of binder copolymers which preferably carry hydroxyl, amide or carboxyl groups or other functional groupings such as those described above.

It is very particularly preferable to employ acrylic resins and/or methyl-etherified melamine resins (for example (R)Maprenal MF 900) as extraneous crosslinking components. For example, in a preferred embodiment of the coating produced by extraneous crosslinking, 20 parts by weight of a dispersion according to the invention are mixed with 3.4 parts by weight of Maprenal MF 900, and, after drying, the coating is baked for 30 minutes at 180° C.

Surprisingly, dispersion copolymers according to the invention having particularly advantageous technical properties in use are obtained if they are prepared by emulsion or suspension copolymerization with the addition of free radical chain transfer substances. Free radical chain transfer substances which are preferred in this respect are such known compounds, used in such amounts, as are frequently employed, for example in emulsion polymerization, for the purpose of regulating the molecular weight, for example mercaptans, in which respect n-dodecylmercaptan, tert.-dodecyl mercaptan, thioglycolic acid and thioglycolic acid esters are used preferentially, or halogenated compounds, such as, for example, carbon tetrachloride, bromotrichloromethane and chlorobenzene, and other compounds which are active transfer agents, preferably toluene and α-methylstyrene. Polyfunctional free radical chain transfer agents containing HS groups, especially, for example, the thioglycolic acid esters of ethylene glycol, 1,2-propylene glycol, 1,3-propylene glycol, 1,2-butylene glycol, 1,3-butylene glycol, 1,4-butylene glycol, glycerol, trimethylolpropane, pentaerythritol and di-, tri- or tetraethylene glycol are particularly preferred. Tetrakismercaptoacetylpentaerythritol is very particularly preferred.

In a further preferred embodiment, a water-soluble substance which preferably improves the rheological properties of the aqueous system is also added to the coarsegrained binder copolymer dispersions described above. In particular, a property which is frequently desired in this case is that of thickening, such as is achieved, for example, preferably by adding water-soluble polymers, such as modified celluloses, for example cellulose ethers, and/or poly(meth)acrylate thickeners, polyacrylamides, polyvinylpyrrolidone and other compounds. In preferred embodiments it can also be advantageous, however, to exercise other influences on the rheological properties of the aqueous copolymer dispersions and of the pigmented lacquer mixtures produced from them. For example, a thixotropic influence is frequently of interest, in order to counteract a possible tendency of dispersed particles in the aqueous system to settle out, and, if appropriate, to avoid at the same time the tendency of already applied lacquers to run off more or less vertical surfaces. In this case it is preferable to employ thixotropic agents which are effective in aqueous systems, such as, for example, titanates and/or colloidal grades of $SiO_2$ (for example Aerosil). In certain cases it can be advantageous to combine with one another the use of the watersoluble and rheologically effective polymers mentioned above and the use of agents which have a thixotropic effect, and to make use of any synergistic effects of the two components which may result in a given case.

The invention is illustrated in greater detail by means of the examples below.

COMPARISON EXAMPLE 1

Preparation of a binder dispersion (a dispersion copolymer without functional monomer units, as a comparison)

(A) Seed base (1 VA)

The dispersion employed as the seed base is prepared by the following process:

7.5 parts by weight of a monomer emulsion composed of 438 parts by weight of $H_2O$, 31.5 parts by weight of isooctylphenol polyglycol ether (10 EO units), 15.7 parts by weight of sodium laurylsulfate, 31.5 parts by weight of trichlorobromomethane, 787.5 parts by weight of methyl methacrylate and 787.5 parts by weight of butyl acrylate are added at 80° C. to an initial amount of 750 parts by weight of water. The polymerization is initiated by adding 10 parts by weight of a solution of 2 parts by weight of ammonium persulfate in 100 parts by weight of $H_2O$, also at 80° C. The remainder of the initiator solution is metered in together with the remaining monomer emulsion in the course of 4 hours. Completion of the reaction is effected in the course of 1 hour, also at 80° C. Solids content of the resulting dispersion: 55.1% by weight; average particle size: 0.22 μm.

(B) Seed polymerization, trial 1 VB/1

100 parts by weight of a mixture of 480 parts by weight of methyl methacrylate, 120 parts by weight of butyl acrylate and 6 parts by weight of tetrakismercaptoacetylpentaerythritol (free radical chain transfer agent) are added to a mixture of 18.2 parts by weight of seed base 1 VA and 714 parts by weight of water, and polymerization is initiated at 80° C. by means of 10 parts by weight of a solution of 1.5 parts by weight of ammonium persulfate in 100 parts by weight of water.

After 30 minutes preliminary polymerization, the metering in of the remaining amount of monomers is begun (total metering time: 7.5 hours). When half the amount of monomers has been added, metering in of a solution of 0.6 part by weight of sodium laurylsulfate in 100 parts by weight of water is begun. This solution is metered in at such a rate that half of this solution has been added when the metering in of the monomers has been completed, and the remainder is added all at once. Solids content of the resulting dispersion: 39.5% by weight; average particle size: 0.70 μm.

(C) Using seed base 1 VA, the further polymerization trials 1 VB/2, 1, VB/3 and 1 VB/4 are carried out by the procedure described under B, trial 1 VB/1, with the modification that the proportion of free radical chain transfer agent (FRCTA) is varied in the manner indicated in Table 1. The amounts of FRCTA and the properties of the resulting dispersions are shown in summary form in Table 1. The technical properties of the dispersions in use are summarized in Table 2.

TABLE 1

Seed polymerizations carried out by procedure 1 VB/1 using increasing amounts of FRCTA (tetrakismercaptoacetylpentaerythritol)

| | Emulsion Copolymerization | | Dispersion | | Copolymer | |
|---|---|---|---|---|---|---|
| Trial No. | Seed Latex | Parts by weight of FRCTA | Particle size (μm) | Solids content (% by weight) | Melt viscosity, mPa.s at 180° C. | Glass transition temperature (°C.)* |
| 1 VB/1 | 1 VA | 6 | 0.70 | 39.5 | 650,000 | 65.5 |
| 1 VB/2 | 1 VA | 12 | 0.75 | 39.5 | 138,000 | 60 |
| 1 VB/3 | 1 VA | 18 | 0.74 | 39.0 | 40,000 | 56 |
| 1 VB/4 | 1 VA | 30 | 0.74 | 38.2 | 1,500 | 49.5 |

*Determined by differential thermal analysis

TABLE 2

Technical properties in use of pigmented and unpigmented baking lacquers based on dispersions from trials 1 VB/1 to 1 VB/4

| | Coating[1] with unpigmented[3] dispersion | | | Coating[1] with pigmented[4] dispersion | | |
|---|---|---|---|---|---|---|
| Dispersion from trial No. | powder coating after the dispersion has been exposed | after baking[2] at 150° C. for 30 minutes | thickness of coating (μm) | powder coating after the dispersion has been exposed | after baking[2] at 150° C. for 30 minutes | thickness of coating (μm) |
| 1 VB/1 | ++ | cracking | 50 | ++ | cracking | 27 |
| 1 VB/2 | ++ | + | 30 | ++ | + | 35 |
| 1 VB/3 | ++ | + | 30 | ++ | + | 30 |
| 1 VB/4 | ++ | + | 30 | ++ | + | 22 |

[1]Phosphated iron sheets (bonder 132) are coated.
[2]All the baked coatings have a resistance of less than 1 minute to xylene at 20° C.
++ = crack-free powder layer
+ = crack-free film
[3]Unpigmented dispersions: solids content approx. 39% by weight, pH = 2.5
Composition: 100.0 parts by weight of dispersion (solids content 40% by weight)
4.5 parts by weight of wetting agent mixture[x]
104.5 parts by weight
[4]Pigmented dispersions: pigment/binder ratio = 0.2 : 1, pH = 8.9
Composition: 100.0 parts by weight of dispersion (solids content 40% by weight)
4.5 parts by weight of wetting agent mixture[x]
30.0 parts by weight of $TiO_2$ paste[xx]
134.5 parts by weight
[x]Wetting agent mixture: 10 parts by weight of Orotan 731 SD[a] 25% by weight solution in $H_2O$
20 parts by weight of Triton CF 10[b]
15 parts by weight of sodium nitrite, 10% by weight solution in $H_2O$
45 parts by weight
[xx]$TiO_2$ paste: 320.0 parts by weight of $TiO_2$ Cl 310

TABLE 2-continued

Technical properties in use of pigmented and
unpigmented baking lacquers based on dispersions
from trials 1 VB/1 to 1 VB/4

|  |  |
|---|---|
| | (rutile grade, Kronos Cl 310) |
| 4.8 | parts by weight of Triton CF 10[b] |
| 3.2 | parts by weight of Orotan 731 SD[a], 25% by weight solution in $H_2O$ |
| 10.2 | parts by weight of Viscalex HV 30 (polyacrylate thickener) |
| 450.0 | parts by weight of $H_2O$ |
| 788.2 | parts by weight |

[a]Orotan 731 SD = Na salt of a copolymer formed from diisobutene and maleic anhydride
[b]Triton CF 10 = isooctylphenolpolyglycol benzyl ether

EXAMPLE 1

Seed polymerizations are carried out using seed base 1 VA from comparison Example 1 A, analogously to comparison Example 1 B, trial 1 VB/1. The mixture of monomers employed in each case is a total of 600 parts by weight in which the comonomers methyl methacrylate and butyl acrylate are present in a 4:1 ratio by weight and, in addition, the comonomers carrying functional and crosslinkable groups, methacrylic acid (MAA) and glycidyl methacrylate (Glyma) are present in the percentage proportions (% by weight) indicated in Table 3. Table 3 also shows the solids content of the resulting dispersions. The comparison Example 2 in Table 3 contains percentage proportions of the comonomers MAA or Glyma such as can be deduced from the known state of the art. The proportion of FRCTA (tetrakismercaptoacetylpentaerythritol is in all cases 3% by weight, relative to the mixture of monomers. The average particle diameter of the resulting dispersions is approx. 0.8 μm.

TABLE 3

Varying the content, in the copolymer dispersions, of comonomer units (MAA and Glyma) carrying functional, crosslinkable groups

| Dispersion No. | Content of MAA (% by weight) | Content of Glyma (% by weight) | Content of MAA + Glyma in the copolymer (% by weight) | Solids content of the dispersion (% by weight) |
|---|---|---|---|---|
| Comparison Example 2 | 3.7 | 4.6 | 8.3 | 40.2 |
| 1 B/1 | 5.3 | 6.6 | 11.9 | 38.2 |
| 1 B/2 | 6.0 | 7.6 | 13.6 | 37.7 |
| 1 B/3 | 6.8 | 8.5 | 15.3 | 37.8 |

Table 4 shows the resistance to solvents of clear lacquers prepared from the dispersions (binder dispersions) listed in Table 3. For this purpose, phosphated iron sheets (bonder 132) are coated in each case with the clear lacquer dispersions, dried at room temperature and then baked at 150° C. for 30 minutes. The resulting film thickness of the clear lacquer is approx. 27 to 30 μm.

Specifically, Table 4 shows the resistance to xylene of the clear lacquers at 20° C. (in minutes) and the resistance to water at 20° C. (in hours). As shown by the result, the coatings prepared from the dispersions, according to the invention, Nos. 1 B/1, 1 B/2 and 1 B/3 are markedly superior to those prepared from comparison Example 2.

TABLE 4

The resistance to solvents of baked dispersion clear lacquers[1] prepared from dispersions Nos. 1 B/1, 1 B/2, 1 B/3 and comparison Example 2.

| Baked coating from lacquer dispersion, prepared from binder dispersion No. | Comparison Example 2 | 1 B/1 | 1 B/2 | 1 B/3 |
|---|---|---|---|---|
| Resistance of the clear lacquer to xylene at 20° C. in minutes (') | 6' | 23' | 170' | 510' |
| Resistance of the clear lacquer to water at 20° C. in hours (hr.) | 350 hr. | 480 hr. | 480 hr. | 480 hr. |

[1]Recipe for the formulation of the clear lacquers:
  100.00 parts by weight of dispersion, solids content 40% by weight
  2.00 parts by weight of wetting agent mixture[x]
  102.00 parts by weight
All the constituents of the recipe are added with stirring to the initially taken dispersion.
[x]Wetting agent mixture:

TABLE 4-continued

The resistance to solvents of baked dispersion clear lacquers[1] prepared from dispersions Nos. 1 B/1, 1 B/2, 1 B/3 and comparison Example 2.

| Baked coating from lacquer dispersion, prepared from binder dispersion No. | Comparison Example 2 | 1 B/1 | 1 B/2 | 1 B/3 |
|---|---|---|---|---|

10.00 parts by weight of Orotan 731 SD, 25% by weight solution in H$_2$O
20.00 parts by weight of Triton CF 10
15.00 parts by weight of sodium nitrite, 10% strength by weight solution in H$_2$O
45.00 parts by weight

EXAMPLE 2

Seed polymerizations are carried out analogously to Example 1, using seed base 1 VA and, in each case, 600 parts by weight of a total mixture of monomers. As a modification of Example 1, in addition to MAA and Glyma, the total mixture of monomers also contains hydroxyethyl methacrylate (=Hema) as a comonomer containing a functional, crosslinkable group, in the percentage proportions (% by weight) indicated in Table 5, relative to the total mixture of monomers, in which the comonomers methyl methacrylate and butyl acrylate are always present in a 4:1 ratio by weight. In all the trials, the proportion of FRCTA is 4% by weight. The average particle diameter of the resulting dispersions is within the range from 0.8 to 0.9 μm. Table 5 also shows the percentage total content (% by weight) of comonomers containing a functional, crosslinkable group and also the solids content (% by weight) of the dispersions resulting in trials 2 B/1, 2 B/2 and 2 B/3, as well as comparison Example 2.

TABLE 5

Varying the content, in copolymer dispersions, of comonomer units (MAA, Glyma and Hema) carrying functional, crosslinkable groups.

| Dispersion No. | Content of MAA (% by weight) | Content of Glyma (% by weight) | Content of Hema (% by weight) | Content of MAA + Glyma + Hema in the copolymer (% by weight) | Solids content of the dispersion (% by weight) |
|---|---|---|---|---|---|
| Comparison Example 2 | 3.7 | 4.6 | — | 8.3 | 40.2 |
| 2 B/1 | 3.5 | 4.4 | 4.0 | 11.9 | 37.9 |
| 2 B/2 | 3.5 | 4.3 | 5.8 | 13.6 | 37.6 |
| 2 B/3 | 3.4 | 4.3 | 7.6 | 15.3 | 40.6 |

The resulting dispersions are tested as selfcrosslinking and as extraneously crosslinking binder dispersions in baking lacquer systems. The result is shown in summary form in Table 6. The lacquers are formulated in accordance with recipes Nos. 1 to 4 below:

Recipes

No. 1: Clear lacquer, self-crosslinking, without melamine resin and without catalyst
100.00 parts by weight of binder dispersion, 40% strength by weight
0.50 part by weight of sodium nitrite, 10% strength solution in H$_2$O
2.00 parts by weight of wetting agent mixture[x]
102.50 parts by weight
No. 2: Clear, lacquer, extraneously crosslinking, containing melamine resin and catalyst
100.00 parts by weight of binder dispersion, 40% strength by weight -continued Recipes 0.50 part by weight of sodium nitrite, 10% strength by weight solution in H$_2$O
2.00 parts by weight of wetting agent mixture[x]
6.80 parts by weight of Maprenal MF 900, 100% strength (= methyl-etherified melamine-formaldehyde resin)
0.80 part by weight of catalyst mixture[xx]
110.10 parts by weight
No. 3 White enamel, self-crosslinking, without melamine resin and without catalyst
100.00 parts by weight of binder dispersion, 40% strength by weight
0.50 part by weight of sodium nitrite, 10% strength by weight solution in H$_2$O
2.00 parts by weight of wetting agent mixture[x]
102.50 parts by weight
No. 4: White enamel, extraneously crosslinking, containing melamine resin and catalyst
110.10 parts by weight of clear lacquer of recipe No. 2 above
24.00 parts by weight of TiO$_2$ paste[xxx]
134.10 parts by weight In each case, all the constituents of the recipe are added to the initially taken dispersion with stirring. Maprenal MF 900 is diluted to a solids content of 50% by weight with water.

[x]Wetting agent mixture:
10.00 parts by weight of Orotan 731 SD, 25% by weight in H$_2$O
20.00 parts by weight of Triton CF 10
15.00 parts by weight of sodium nitrite, 10% by weight solution in H$_2$O
45.00 parts by weight

[xx]Catalyst mixture:
36.40 parts by weight of p-toluenesulfonic acid
46.00 parts by weight of H$_2$O
17.00 parts by weight of dimethylaminoethanol
99.40 parts by weight -continued xxxTiO2 paste:
  400.00 parts by weight of TiO2 Cl 310
  4.80 parts by weight of Triton CF 10
  3.20 parts by weight of Orotan 731 SD, 25% by
       weight solution in H2O
  192.00 parts by weight of H2O
  600.00 parts by weight Table 6 shows the resistance to solvents of clear lacquers and white enamels, self-crosslinking and extraneously crosslinking, prepared from the binder dispersions listed in Table 6, Nos. 2 B/1, 2 B/2, 2 B/3 and comparison Example 2 corresponding to the recipes indicated in Table 5. For this purpose, phosphated iron sheets (bonder 132) are in each case coated with the appropriate lacquer dispersions, dried at room temperature and then baked at 180° C. for 30 minutes. The resulting lacquer films have a thickness of approx. 30 μm.

Specifically, Table 6 shows the resistance to xylene of the baked lacquers at 20° C. (in minutes), and also their resistance to ethanol at 20° C. (in minutes) and their resistance to water at 20° C. (in hours). As the results show, the coatings produced from the binder dispersions, according to the invention, Nos. 2 B/1, 2 B/2 and 2 B/3 are markedly superior to those produced from comparison Example 2.

TABLE 6

Resistance to solvents of clear lacquers and white enamels in the form of self-crosslinking and extraneously crosslinking baked coatings (baked at 180° C. for 30 minutes)

| Lacquer dispersion, prepared from binder dispersion No. | Comparison Example 2 | 2 B/1 | 2 B/2 | 2 B/3 |
|---|---|---|---|---|
| *a*Resistance to xylene of the baked coatings at 20° C., quoted in minutes (') | | | | |
| Clear lacquer (self-crosslinking) | 25' | 55' | 65' | 110' |
| White enamel (self-crosslinking) | 35' | 50' | 90' | 100' |
| Clear lacquer (extraneously crosslinking) | 150' | 960' | 7560' | 3060' |
| White enamel (extraneously crosslinking) | 140' | 1320' | 2880' | 7200' |
| *b*Resistance to ethanol of the baked coatings at 20° C., quoted in minutes (') | | | | |
| White enamel (self-crosslinking) | 1' | 1' | 3' | 10' |
| White enamel (extraneously crosslinking) | 65' | 960' | 8640' | 8640' |
| *c*Resistance to water of the baked coatings at 20° C., quoted in hours (hr.) | | | | |
| Clear lacquer (self-crosslinking) | 1300 hr. | >3000 hr. | >3000 hr. | >3000 hr. |
| White enamel (self-crosslinking) | 1000 hr. | >3000 hr. | >3000 hr. | >3000 hr. |
| Clear lacquer (extraneously crosslinking) | 650 hr. | 2600 hr. | 2600 hr. | >3000 hr. |
| White enamel (extraneously crosslinking) | 264 hr. | 1350 hr. | >3000 hr. | 1250 hr. |

What is claimed is:

1. A process for bake-coating a surface of a solid substrate which comprises applying a sufficient amount of aqueous dispersion to the surface to be coated, drying and subsequently baking the resulting dried dispersion layer with crosslinking of binder copolymer, which comprises carrying out the drying of an amount of dispersion applied at a temperature below the minimum film-forming temperature of the dispersion and then baking the dried coating at a temperature below the minimum film-forming temperature of the dispersion and then baking the dried coating at a temperature above the glass transition temperature;

the aqueous dispersion being suitable for producing a crosslinkable surface coating and containing, as binder, a crosslinkable dispersion copolymer formed from olefinicallyunsaturated monomers and, optionally, further comprising a member selected from the group consisting of pigment, dyestuff, extender, water-soluble and/or water-dispersible resin, extraneous crosslinking agent, crosslinking catalyst, thickener, thixotropic agent, wetting agent, anti-corrosion agent, antifreeze agent, light stabilizer, anti-oxidant and anti-foaming agent; dispersed copolymer particles of the dispersion having average particle diameters of from 0.5 to 10 microns; the proportion of monomer units carrying crosslinkable groups in the dispersion copolymer being greater than 10% by weight, relative to the dispersion copolymer.

2. The process as claimed in claim 1, wherein the minimum film-forming temperature of the dispersion is within the temperature range from 35° to 120° C.

3. A process for bake-coating a surface of a solid substrate which comprises applying a sufficient amount of aqueous dispersion to the surface to be coated, drying and subsequently baking the dried dispersion layer with crosslinking of the binder copolymer, which comprises carrying out the drying of an amount of dispersion applied at a temperature below the minimum film-forming temperature of the dispersion and then baking the dried coating at a temperature below the minimum film-forming temperature of the dispersion and then baking the dried coating at a temperature above the glass transition temperature;

the aqueous dispersion being one which is useful for producing a crosslinkable surface coating and containing, as binder, a crosslinkable dispersion copolymer prepared by radically-initiated emulsion or suspension copolymerization of olefinically-unsaturated monomers with the addition of a free-radical chain-transfer agent, the dispersion copolymer comprising functional and nonfunctional monomer units, the functional monomer units being those of comonomer units carrying crosslinkable groups selected from those consisting of hydroxyl, amido, aldehyde, carboxyl, amino, epoxy, thiol, cyano, N-methylol, isocyanato and masked isocyanato, the dispersion copolymer containing said functional monomer units carrying crosslinkable groups in a proportion in excess of 10% by weight, relative to the weight of said dispersion copolymer, the dispersion copolymer being in the form of dispersed particles having an average particle diameter of from 0.5 to 10 microns.

the aqueous dispersion copolymer having a minimum film-forming temperature (MFT) within the range of from 35° to 120° C., the dispersion being one which, on applying a sufficient amount on a surface to be coated and drying it at a temperature below the MFT, forms a crack-free powder layer, said layer being one which, after being baked at a temperature about the glass-transition temperature (Tg) of the dispersion copolymer, forms a crack-free film.

4. A process as claimed in claim 3 wherein the dispersion copolymer has a glass transition temperature of no less than 49.5° C.

5. A process as claimed in claim 1 which consists essentially of carrying out the drying of dispersion applied at a temperature below the minimum film-forming temperature of the dispersion, then baking the dried coating at a temperature below the minimum film-forming temperature of the dispersion and subsequently baking the dried coating at a temperature above the glass transition temperature.

6. A process as claimed in claim 1 wherein the crosslinkable dispersion copolymer is self-crosslinkable.

7. A process as claimed in claim 3 which consists essentially of carrying out the drying of dispersion applied at a temperature below the minimum film-forming temperature of the dispersion, then baking the dried coating at a temperature below the minimum film-forming temperature of the dispersion and subsequently baking the dried coating at a temperature above the glass transition temperature.

8. A process as claimed in claim 3 wherein the crosslinkable dispersion copolymer is self-crosslinkable.

9. A solid substrate having a bake-coated surface coating thereon in the form of a crack-free film, the composition of which is that of a dried and baked aqueous dispersion, wherein the aqueous dispersion is one which is useful for producing a crosslinkable surface coating and which contains, as binder, a crosslinkable dispersion copolymer formed from olefinically-unsaturated monomers and, optionally, further comprising a member selected from the group consisting of pigment, dyestuff, extender, water-soluble and/or water-dispersible resin, extraneous crosslinking agent, crosslinking catalyst, thickener, thixotropic agent, wetting agent, anti-corrosion agent, antifreeze agent, light stabilizer, anti-oxidant and anti-foaming agent; dispersed copolymer particles of the dispersion having average particle diameters of from 0.5 to 10 microns; the proportion of monomer units carrying crosslinkable groups in the dispersion copolymer being greater than 10% by weight, relative to the dispersion copolymer.

10. A coated solid substrate as claimed in claim 9 wherein the crosslinkable dispersion copolymer is self-crosslinkable.

* * * * *